US009386572B2

(12) United States Patent
Xiong et al.

(10) Patent No.: US 9,386,572 B2
(45) Date of Patent: Jul. 5, 2016

(54) METHOD, DEVICE AND SYSTEM FOR WIRELESS BROADBAND COMMUNICATIONS

(71) Applicant: Huawei Technologies Co., LTD, Shenzhen (CN)

(72) Inventors: Xin Xiong, Beijing (CN); Yinghui Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 222 days.

(21) Appl. No.: 14/155,990

(22) Filed: Jan. 15, 2014

(65) Prior Publication Data

US 2014/0126527 A1 May 8, 2014

Related U.S. Application Data

(63) Continuation of application No. PCT/CN2012/077123, filed on Jun. 19, 2012.

(30) Foreign Application Priority Data

Jul. 15, 2011 (CN) .......................... 2011 1 0199370

(51) Int. Cl.
*H04W 72/04* (2009.01)
*H04W 56/00* (2009.01)
(Continued)

(52) U.S. Cl.
CPC ........ *H04W 72/0413* (2013.01); *H04W 56/001* (2013.01); *H04W 72/1278* (2013.01); *H04W 76/02* (2013.01); *H04W 74/006* (2013.01); *H04W 76/022* (2013.01)

(58) Field of Classification Search
CPC ..................... H04W 72/0413; H04W 72/1278; H04W 56/001; H04W 76/02; H04W 74/006; H04W 76/022
See application file for complete search history.

(56) References Cited

U.S. PATENT DOCUMENTS

2006/0034204 A1* 2/2006 Lee ...................... H04W 76/027
370/312
2009/0316664 A1* 12/2009 Wu ...................... H04W 76/028
370/336

(Continued)

FOREIGN PATENT DOCUMENTS

| CN | 101616411 A | 12/2009 |
|---|---|---|
| CN | 101772199 A | 7/2010 |

(Continued)

OTHER PUBLICATIONS

Kai, Wen, et al., "Research and Implementaion of LTE RRC Connection Establishment Process of Network Side," 2010 International Conference on Educational and Informational Technology (ICEIT 2010), vol. 3, Sep. 2010, pp. V3-229-V3-232.

(Continued)

*Primary Examiner* — Paul H Masur
*Assistant Examiner* — Kabir Jahangir
(74) *Attorney, Agent, or Firm* — Slater Matsil, LLP

(57) ABSTRACT

A small cell receives a dedicated synchronization signal Preamble sent through a first message by a user equipment UE in an idle state. The dedicated Preamble is allocated when the UE accesses a network for the first time. The small cell according to the dedicated Preamble queries whether a first signaling radio bearer SRB1 and/or a second signaling radio bearer SRB2 of the UE are/is stored. If stored, the small cell replies in a second message to the UE that indication information that the SRB1 and/or the SRB2 between the small cell and the UE do/does not need to be re-established or modified. An uplink radio resource control RRC message sent through a dedicated control channel DCCH by the UE is received.

14 Claims, 12 Drawing Sheets

(51) Int. Cl.
*H04W 76/02* (2009.01)
*H04W 72/12* (2009.01)
*H04W 74/00* (2009.01)

(56) References Cited

U.S. PATENT DOCUMENTS

| | | | |
|---|---|---|---|
| 2010/0111039 A1* | 5/2010 | Kim | H04W 76/048 370/331 |
| 2010/0195621 A1* | 8/2010 | Kekki | H04W 48/17 370/332 |
| 2011/0149728 A1 | 6/2011 | Lee | |
| 2011/0294508 A1* | 12/2011 | Min | H04W 36/0083 455/436 |
| 2013/0072182 A1* | 3/2013 | Jung | H04W 24/10 455/422.1 |
| 2013/0171995 A1* | 7/2013 | Fujishiro | H04W 28/08 455/441 |
| 2013/0308539 A1 | 11/2013 | Wu | |

FOREIGN PATENT DOCUMENTS

| | | |
|---|---|---|
| CN | 101848539 A | 9/2010 |
| EP | 2139292 A2 | 12/2009 |
| EP | 2309817 A1 | 4/2011 |
| WO | 2009057932 A2 | 5/2009 |

OTHER PUBLICATIONS

International Search Report and Written Opinion received in Application No. PCT/CN2012/077123 mailed Sep. 27, 2012, 10 pages.

* cited by examiner

METHOD, DEVICE AND SYSTEM FOR WIRELESS BROADBAND COMMUNICATIONS

This application is a continuation of International Application No. PCT/CN2012/077123, filed on Jun. 19, 2012, which claims priority to Chinese Patent Application No. 201110199370.9, filed on Jul. 15, 2011, both of which are hereby incorporated by reference in their entireties.

TECHNICAL FIELD

The present invention relates to the field of wireless communications, and in particular, to a method, a device and a system for wireless broadband communications.

BACKGROUND

With advancements of sciences and technologies, requirements made by people for a mobile communication service and quality are also improved continuously. However, emphasis of researches is focused on using limited spectrum resources to improve transmission quality and lower operating cost.

At present, mobile communications which are based on a wireless technology are applied extensively in an indoor use market and an outdoor use market. The wireless technology is used in such a great scale, and at present, the driving force of the mobile communications development derives from demands for a broadband data service, which greatly impacts a public mobile wireless network as well, and particularly impacts a long term evolution technology (LTE) likewise positioned as an indoor scenario.

In the prior art, a logic architecture of an LTE home base station (LTE Home eNode B) is connected to a mobility management entity (MME) through an S1 interface. Because there are many LTE home base stations, if the LTE home base station is directly connected to the MME through the S1 interface, the performance and the cost of the MME may be affected greatly. Therefore, the standard adopts that, an intermediate node, that is, a home base station gateway (HeNB Gateway or HeNB GW), is added between the MME and the LTE home base station, so as to avoid too many S1 interfaces on the MME.

Functionally, a function of the home base station is completely identical with a function of an ordinary base station, which is incapable of satisfying demands of a next generation mobile broadband communications technology for lowering the cost at the same time of improving the bandwidth and the capacity.

SUMMARY OF THE INVENTION

Embodiments of the present invention provide a method, a device and a system for wireless broadband communications, which are used to improve the bandwidth and the capacity of mobile broadband communications, and lower the cost at the same time.

A method for wireless broadband communications is provided in an embodiment of the present invention. A small cell receives a dedicated synchronization signal Preamble sent through a first message by a user equipment UE in an idle state. The dedicated Preamble is allocated when the UE accesses a network for the first time. The small cell according to the dedicated Preamble queries whether a first signaling radio bearer SRB 1 and/or a second signaling radio bearer SRB2 of the UE are/is stored. If stored, the small cell replies in a second message to the UE that indication information that the SRB 1 and/or the SRB2 between the small cell and the UE do/does not need to be re-established or modified. An uplink radio resource control RRC message sent through a dedicated control channel DCCH by the UE is received.

A method for wireless broadband communications is provided in an embodiment of the present invention. UE sends a dedicated Preamble through a first message when the UE is in an idle state. The dedicated Preamble is allocated when the UE accesses a network for the first time. If the UE receives indication information, sent by a small cell in a second message, that a first signaling radio bearer SRB 1 and/or a second signaling radio bearer SRB2 of the UE do/does not need to be re-established or modified, the UE sends an uplink RRC message through a dedicated control channel DCCH.

A small cell for wireless broadband communications is provided in an embodiment of the present invention. A transceiver module is configured to receive a dedicated Preamble sent through a first message by a UE in an idle state. The dedicated Preamble is allocated when the UE accesses a network for the first time. The transceiver module is also configured to send a second message to the UE after a processing module determines that a first signaling radio bearer SRB 1 and/or a second signaling radio bearer SRB2 of the UE are/is stored. The transceiver module is also configured to receive an uplink radio resource control RRC message sent through a dedicated control channel DCCH by the UE after the second message is sent. The processing module is configured to query whether the SRB 1 and/or the SRB2 of the UE are/is stored according to the dedicated Preamble received by the transceiver module and is also configured to carry indication information, in the second message sent by the transceiver module, that the SRB 1 and/or the SRB2 between the small cell and the UE do/does not need to be re-established or modified after it is determined that the SRB 1 and/or the SRB2 of the UE are/is stored.

A UE for wireless broadband communications is provided in an embodiment of the present invention. A transceiver module is configured to send a dedicated synchronization signal Preamble through a first message when the UE is in an idle state. The dedicated Preamble is allocated when the UE accesses a network for the first time. The transceiver module is also configured to receive indication information sent by a small cell in a second message and to send an uplink RRC message through a dedicated control channel DCCH based on a notification of a processing module. The processing module is configured to notify the transceiver module to send an uplink RRC message through the DCCH when it is determined that the indication information received by the transceiver module is indication information that a first signaling radio bearer SRB 1 and/or a second signaling radio bearer SRB2 of the UE do/does not need to be re-established or modified.

Compared with the prior art, in the method, the device and the system provided in the embodiments of the present invention, the small cell knows, by determining a Preamble sent by the UE, whether the UE adopts a first signaling radio bearer SRB 1 and/or a second signaling radio bearer SRB2 which are/is default or stored. If it is determined that a default or last configuration is continuously adopted, that the SRB 1 and/or the SRB2 do/does not need to be re-established or modified is replied directly in a random access response message, thereby saving a radio resource control RRC signaling flow, and achieving effects of lowering the cost and sharing data traffic of a macro base station, so that the bandwidth and the capacity of mobile broadband communications are improved.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
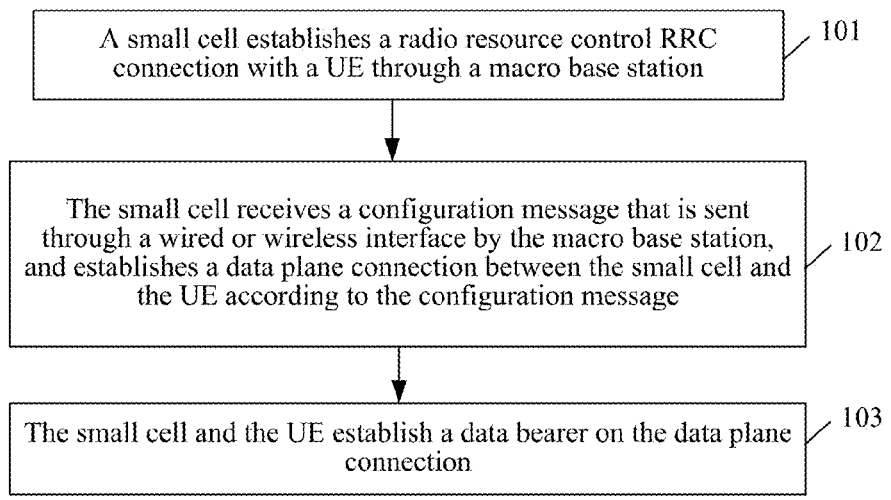
FIG. 1 is a flow chart of a method for wireless broadband communications according to an embodiment of the present invention.

FIG. 1 is a flow chart of a method for wireless broadband communications according to an embodiment of the present invention, and the embodiment includes the following steps.

Step 101: A small cell establishes a radio resource control RRC connection with a UE through a macro base station.

Step 102: The small cell receives a configuration message sent through a wired or wireless interface by the macro base station, and establishes a data plane connection between the small cell and the UE according to the configuration message.

Step 103: The small cell and the UE establish a data bearer on the wireless connection.

The embodiment of the present invention is executed by the small cell, and the small cell may be: a small base station (Pico), an indoor base station (Femto), a low mobility base station (Low Mobility, LoMo), another local wireless access point AP, or a UE having a device-to-device (D2D) function. The embodiment takes that the small cell is a LoMo as an example.

The macro base station is mainly configured to implement a control plane function of the UE, including a mobility management function of the UE. The LoMo is mainly configured to bear an indoor low mobility data service, and implement a user plane function. Specifically, a split transmission manner having different paths is adopted for transmitting user plane data and control plane data of the air interface, that is, a link from the LoMo to the UE is only responsible for transmitting the user plane data, and control plane signaling from the LoMo to the UE is established by a link from the macro base station to the UE.

Figure 2:
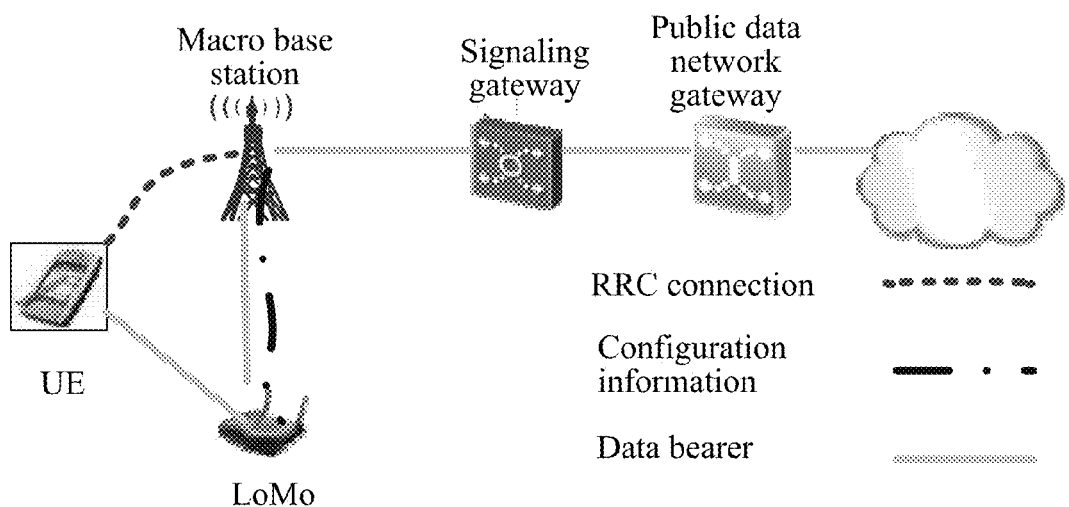
FIG. 2 is a structural diagram of a network topology according to an embodiment of the present invention.

As shown in FIG. 2, the macro base station is directly connected to the UE through the air interface in no need of the LoMo. The LoMo establishes an RRC connection through this interface between the macro base station and the UE. The macro base station and the LoMo are connected through the wired or wireless interface, where the wired interface may include: an S1 interface between a base station and a mobility management entity MME, and/or an X2 interface between a base station and another base station, and/or a common public radio interface CPRI, and/or a lub interface between a radio network controller and a base station. The LoMo receives, through this interface, the configuration message sent through the wired or wireless interface by the macro base station, where the wireless interface includes: a Uu interface between a base station and the UE, and/or a microwave interface for base station transmission. A data bearer between the LoMo and the UE is configured by the foregoing interface between the macro base station and the UE.

Figure 3:
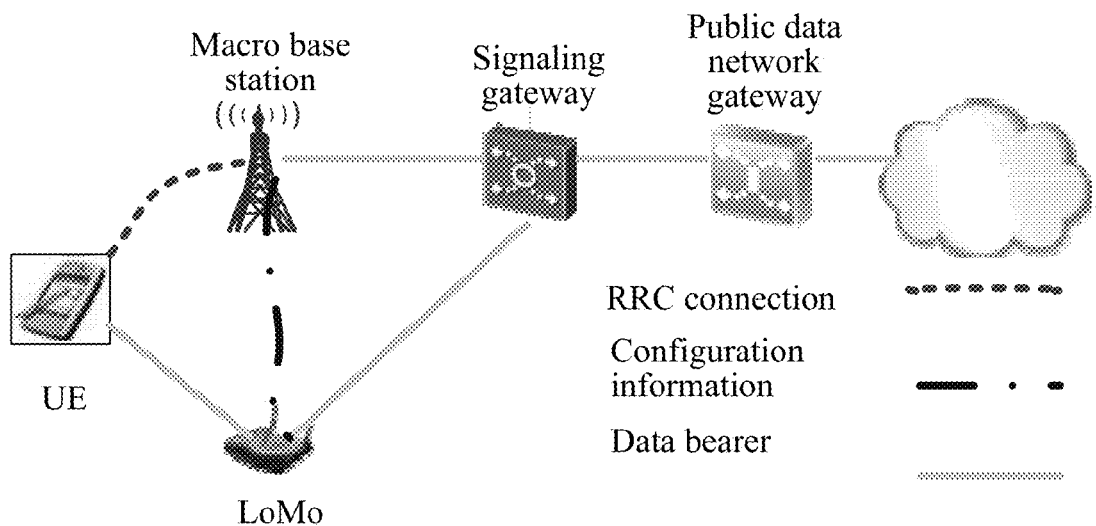
FIG. 3 is a structural diagram of another network topology according to an embodiment of the present invention.

After receiving the user plane data of the UE through the data bearer, the LoMo may send the user plane data to the macro base station through the wired or wireless interface between the macro base station and the LoMo in FIG. 2, so that the macro base station forwards the user plane data of the UE to a network element of a core network; or the LoMo may directly send the user plane data of the UE to the network element of the core network through an interface between the network element of the core network and the LoMo in FIG. 3. The network element of the core network in FIG. 3 is a serving gateway S-GW.

If the LoMo directly performs data transmission with the network element of the core network, the LoMo needs to inform the mobility management entity MME of an address of the LoMo, the MME informs the network element of the core network, and then the MME informs the macro base station of an address of the network element of the core network, which is forwarded by the macro base station to the LoMo. The foregoing address may include: a transport network layer address TNL address, a general packet radio service tunneling protocol-tunnel endpoint identifier GTP-TEID, and/or an Internet protocol IP address.

Figure 4:
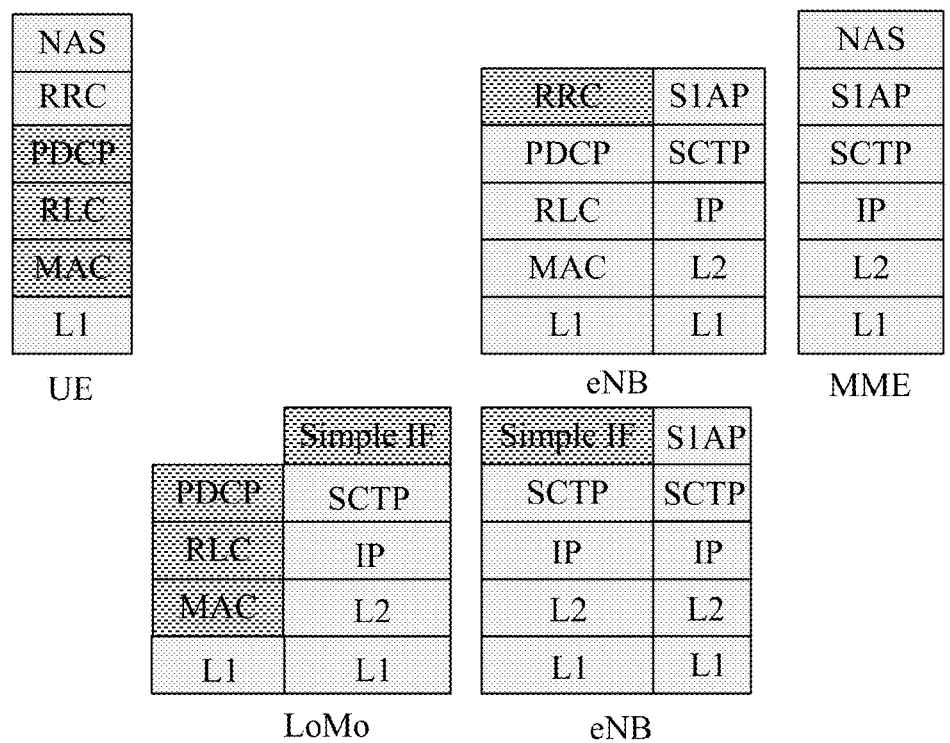
FIG. 4 is a structural diagram of a protocol stack according to an embodiment of the present invention.
Figure 5:
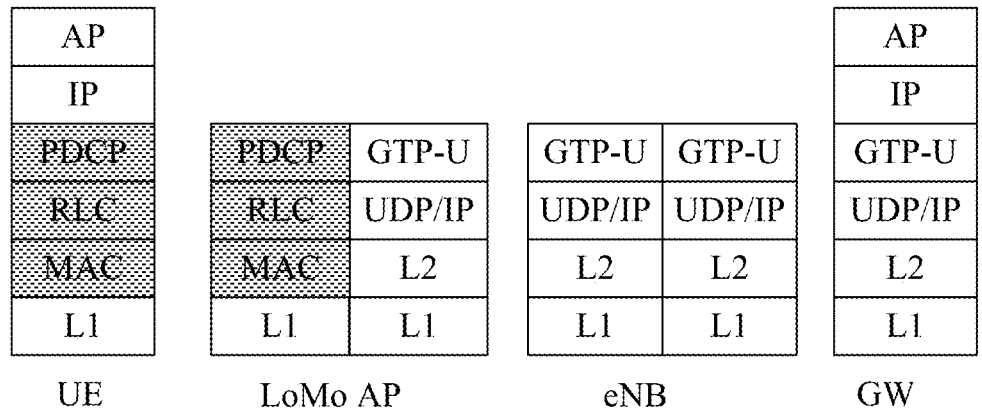
FIG. 5 is a structural diagram of another protocol stack according to an embodiment of the present invention.

A protocol stack of the air interface between the LoMo and the UE may only include: a packet data convergence protocol PDCP, a radio link control RLC layer protocol, a media access control MAC layer protocol, and a layer 1 L1 protocol; and/or not include: a radio resource control RRC layer protocol. That is, on a control plane, the protocol stack of the air interface between the LoMo and the UE may adopt a simplified protocol stack architecture, without, for example, any RRC protocol entity, as shown in FIG. 4. On a user plane, the LoMo and the UE may adopt an original user plane protocol stack PDCP/RLC/MAC, which is only tailored functionally, as shown in FIG. 5.

Figure 6:
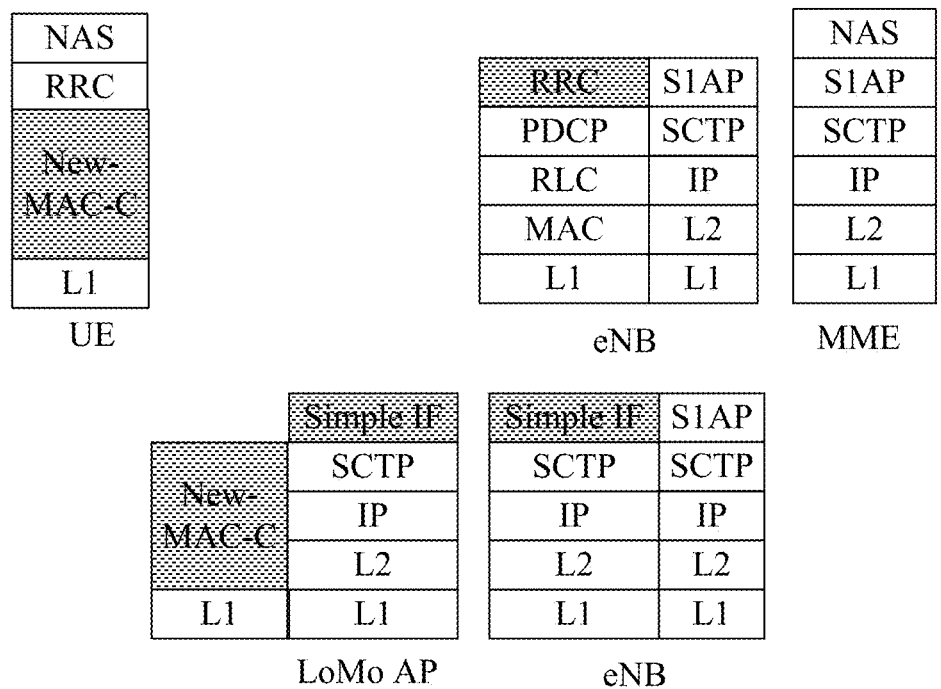
FIG. 6 is a structural diagram of another protocol stack according to an embodiment of the present invention.
Figure 7:
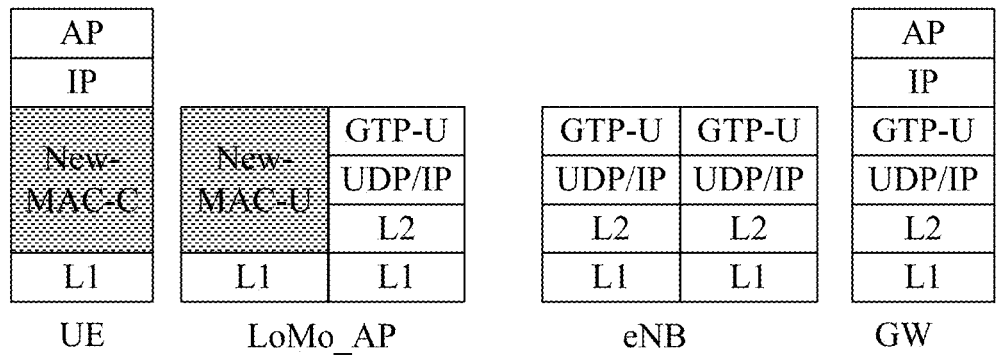
FIG. 7 is a structural diagram of another protocol stack according to an embodiment of the present invention.

A control plane protocol stack between the LoMo and the UE may further combine the PDCP, the RLC and the MAC into a new layer entity, as shown in FIG. 6. A user plane protocol stack between the LoMo and the UE may further combine the PDCP, the RLC and the MAC into a new layer entity, as shown in FIG. 7.

When the small cell is a UE having the D2D function, the following step may further be included before the Step 101: Step 104: When the small cell is near the UE, the UE initiates the RRC connection to the macro base station so as to establish a service. The macro base station determines that the small cell stores data requested by the UE, that is, when the macro base station determines that the near small cell has the data requested by the UE, the macro base station may directly let the small cell transmit the data to the UE.

The foregoing configuration message may further include: allocation information of static or semi-static configuration resources; and resource allocation information used to perform random access on the static or semi-static configuration resources, or resource allocation information used to perform the random access and data scheduling on the static or semi-static configuration resources. If the configuration message only includes the resource allocation information used to perform the random access, after the small cell and the UE establish the data bearer on the data plane connection, it is further included that: the small cell sends, to the UE through the established data bearer, the resource allocation information used to perform the random access on the static or semi-static configuration resources.

If the configuration message includes the static or semi-static resource allocation information used to perform the random access and the data scheduling, after the small cell and the UE establish the data bearer on the data plane connection, it is further included that: the small cell sends, to the UE through the established data bearer, the resource allocation information used to perform the random access and the data scheduling on the configuration resources on the static or semi-static configuration resources. If the random access is performed according to the resource allocation information, or congestion occurs when the random access and the data scheduling are performed, it is further included that: the small cell reapplies to the macro base station for the static or semi-static configuration resources; or the small cell notifies the macro base station to hand over the UE to the macro base station; or the small cell adopts a dynamic scheduling mode for new access when congestion occurs in resources.

The following Table is about function comparison between the macro base station and the LoMo, where the LoMo column lists functions of the LoMo which may be simplified:

TABLE 1

TABLE OF FUNCTION COMPARISON BETWEEN A MACRO BASE STATION AND A LOMO

| Comparison item | eNB | LoMo |
| --- | --- | --- |
| Random access channel (RACH) | Competitive access/ non-competitive access | Only non-competitive access |
| Hybrid automatic repeat request (HARQ) | HARQ | Simple HARQ, such as fewer times of retransmission |
| Scheduling mechanism | Dynamic scheduling/semi-persistent scheduling (SPS) | Simple scheduling |
| Uplink scheduling information | Buffer report (BSR)/power headroom report (PHR)/ scheduling priority processing | Such as no power headroom report |
| DRX (discontinuous reception) | Long and short DRX cycles | Such as a longer DRX cycle |

Compared with the prior art, in the method provided in the embodiment of the present invention, the small cell may establish the radio resource control RRC connection with the UE through the macro base station, and then the macro base station performs configuration on the small cell, thereby saving a flow for establishing the RRC connection with the UE and lowering the cost; then, the small cell and the UE establish the data bearer, so as to share data traffic of the macro base station, thereby improving the bandwidth and the capacity of mobile broadband communications.

Figure 8:
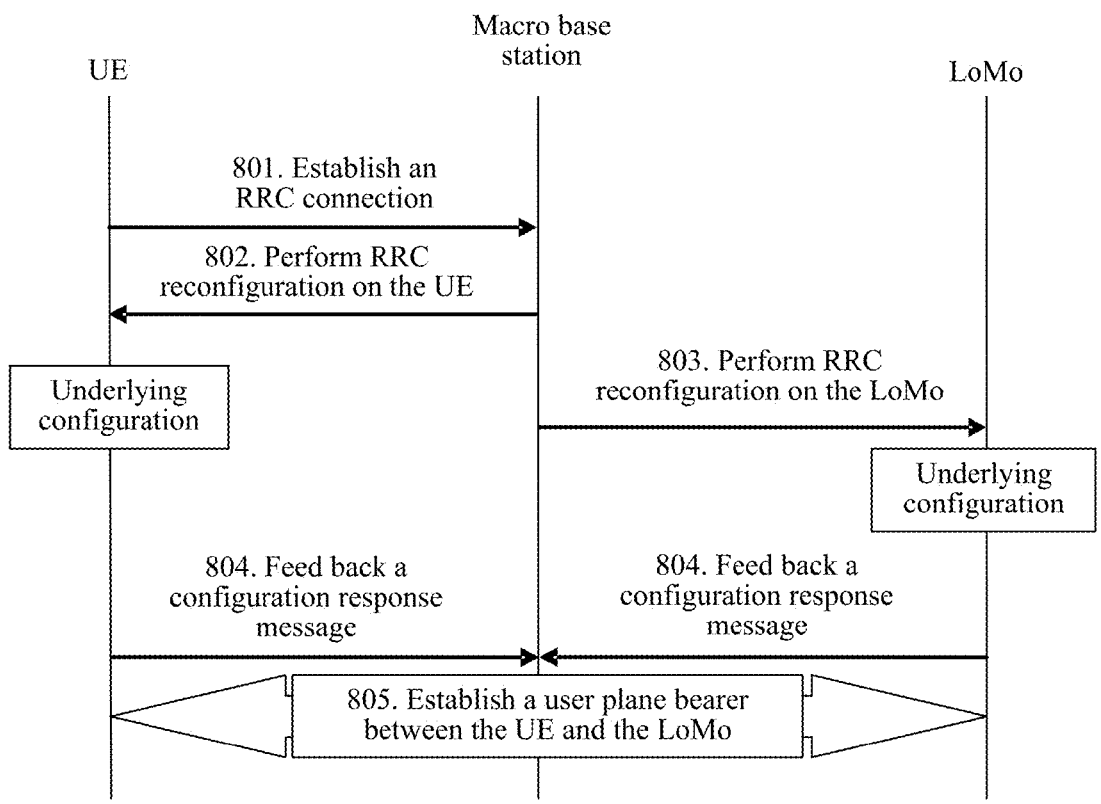
FIG. 8 is a signaling interaction diagram of a method for wireless broadband communications according to an embodiment of the present invention.

FIG. 8 is a signaling interaction diagram of a method for wireless broadband communications according to an embodiment of the present invention, and the embodiment includes the following steps.

Step 801: A UE does not directly access a LoMo, and when initiating a service, the UE first establishes an RRC connection with a macro base station and performs normal authentication and encryption.

Step 802: The macro base station performs RRC reconfiguration on the UE so as to establish a corresponding second signaling radio bearer SRB2, a data radio bearer DRB, measurement control configuration, and the like; after receiving an RRC reconfiguration message (RRC reconfiguration), the UE performs underlying configuration, including radio resource configuration, measurement configuration, and the like.

Step 803: At the same time of sending the RRC reconfiguration message (RRC reconfiguration), the macro base station needs to complete configuration on an underlying user plane protocol stack of the LoMo (including PDCP, RLC and MAC) or a newly defined user plane entity (new MAC) through a newly defined interface (simple IF). A configuration message transmitted by the interface (simple IF) includes radio resource configuration (logical channel configuration, transmission channel configuration and physical channel configuration), and a measurement configuration, and the like.

Specifically, because the number of UEs in an indoor coverage scenario is comparatively small, the radio resource configuration may be static or semi-static RACH resources and/or static or semi-static physical transmission resources. Information of the static or semi-static resources is set according to resource use conditions of a resident at an AP.

Here, Step 202 and Step 203 may be performed simultaneously or successively.

Step 804: The UE and the LoMo each feed back a configuration response message to the macro base station.

According to different information transmitted by the interface (simpe IF), the following three options are available.

Option 1: only the static or semi-static RACH resources are included, and subsequent information for scheduling is notified by the LoMo through a MAC CE (MAC layer control element).

Option 2: the configuration message includes the static or semi-static resource information used to perform random access and subsequent scheduling of the UE; if congestion occurs when resources are allocated, the LoMo reapplies to the macro base station for semi-static resource allocation or hands over the UE to the macro base station.

Option 3: the configuration message includes the static or semi-static resource information used to perform random access and subsequent scheduling of the UE; if resource congestion occurs in the UE in a subsequent access process, a dynamic scheduling mode is adopted for access after the congestion occurs in the resources.

Step 805: The UE and the LoMo establish a user plane bearer.

A relationship between this embodiment and the embodiment in FIG. 1 lies in that, in this embodiment, that the small cell receives the configuration message sent through a wired or wireless interface by the macro base station, and performs configuration according to the configuration message includes that: the small cell receives user plane protocol configuration information sent through the wired or wireless interface by the macro base station, and the small cell configures radio resources and a measurement parameter used to establish a data plane connection with the UE.

Compared with the prior art, in the method provided in the embodiment of the present invention, the small cell may establish the radio resource control RRC connection with the UE through the macro base station, and then the macro base station performs configuration on the small cell, thereby saving a flow for establishing the RRC connection with the UE and lowering the cost; then, the small cell and the UE establish the data bearer, so as to share data traffic of the macro base station, thereby improving the bandwidth and the capacity of mobile broadband communications.

Figure 9:
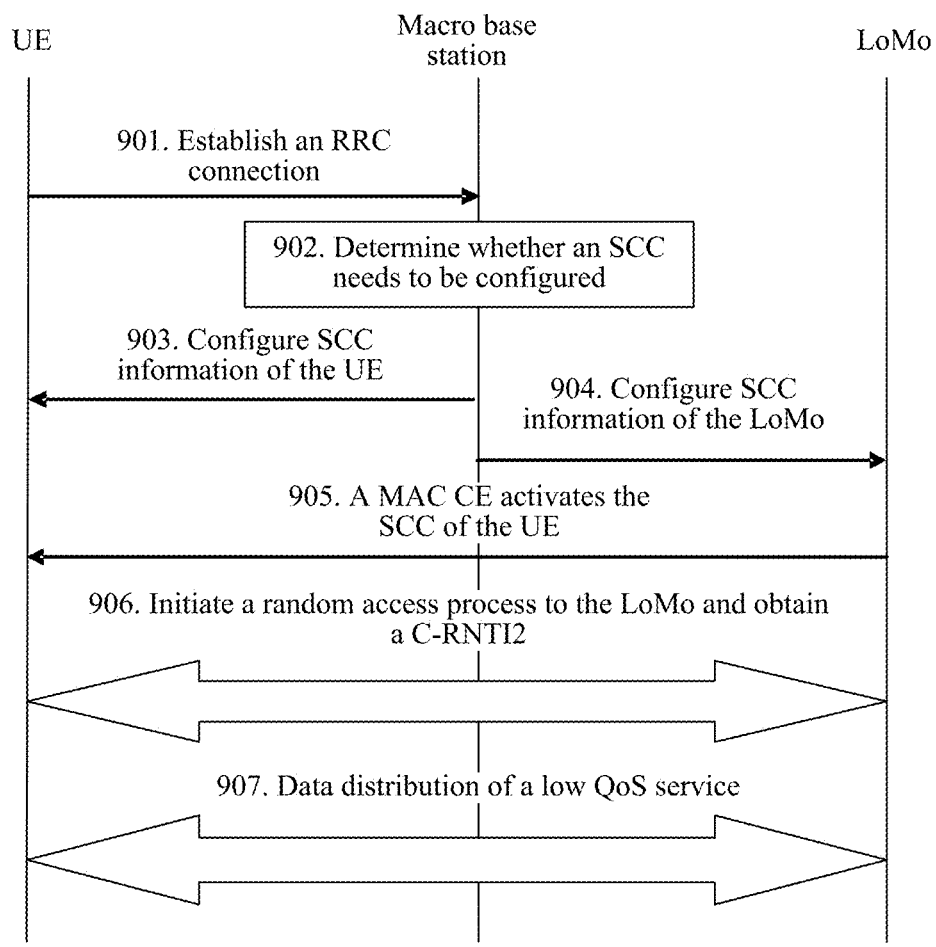
FIG. 9 is a signaling interaction diagram of a method for wireless broadband communications according to an embodiment of the present invention.

FIG. 9 is a signaling interaction diagram of a method for wireless broadband communications according to an embodiment of the present invention, and the embodiment includes the following steps.

Step 901: A UE first establishes an RRC connection with a macro base station.

Step 902: The macro base station determines, according to quality of service (QoS), a scheduling strategy, and/or channel quality of a service, whether a secondary component carrier (SCC) needs to be configured.

Step 903: The macro base station performs SCC related configuration on the UE through a dedicated signaling configuration.

Step 904: The macro base station configures a LoMo through a newly defined interface message, and the LoMo receives an SCC configuration message of the macro base station.

Step 905: Send an activation message to the UE through a MAC CE of the LoMo.

Step 906: After receiving the activation message, the UE performs random access of the LoMo and obtains a new second cell radio network temporary identifier (C-RNTI 2).

Step 907: Perform IP data distribution on downlink data in an LTE macro base station, schedule a service such as voice or vedio having a comparatively high QoS requirement continuously under a primary component carrier PCC, and scramble a physical downlink control channel (PDCCH) by adopting a first cell radio network temporary identifier C-RNTI 1 allocated by the RRC connection; and a service having a comparatively low Qos requirement provides a service under the SCC, and scramble the pdcch by adopting the C-RNTI 2 obtained through the random access under the LoMo.

A relationship between this embodiment and the embodiment in FIG. 1 lies in that, in this embodiment, that the small cell receives a configuration message sent through a wired or wireless interface by the macro base station, and performs configuration according to the configuration message includes that: the small cell receives the SCC configuration information sent through the wired or wireless interface by the macro base station, and the small cell configures the SCC used to establish a data plane connection with the UE.

In this embodiment, a correlation between the PCC and the SCC is invariant forever, that is to say, a link between the UE and the macro base station is the PCC forever, and a link between the UE and the LoMo is the SCC forever.

Compared with the prior art, in the method provided in the embodiment of the present invention, the small cell may establish the radio resource control RRC connection with the UE through the macro base station, and then the macro base station performs configuration on the small cell, thereby saving a flow for establishing the RRC connection with the UE and lowering the cost; then, the small cell and the UE establish the data bearer, so as to share data traffic of the macro base station, thereby improving the bandwidth and the capacity of mobile broadband communications.

Figure 10:
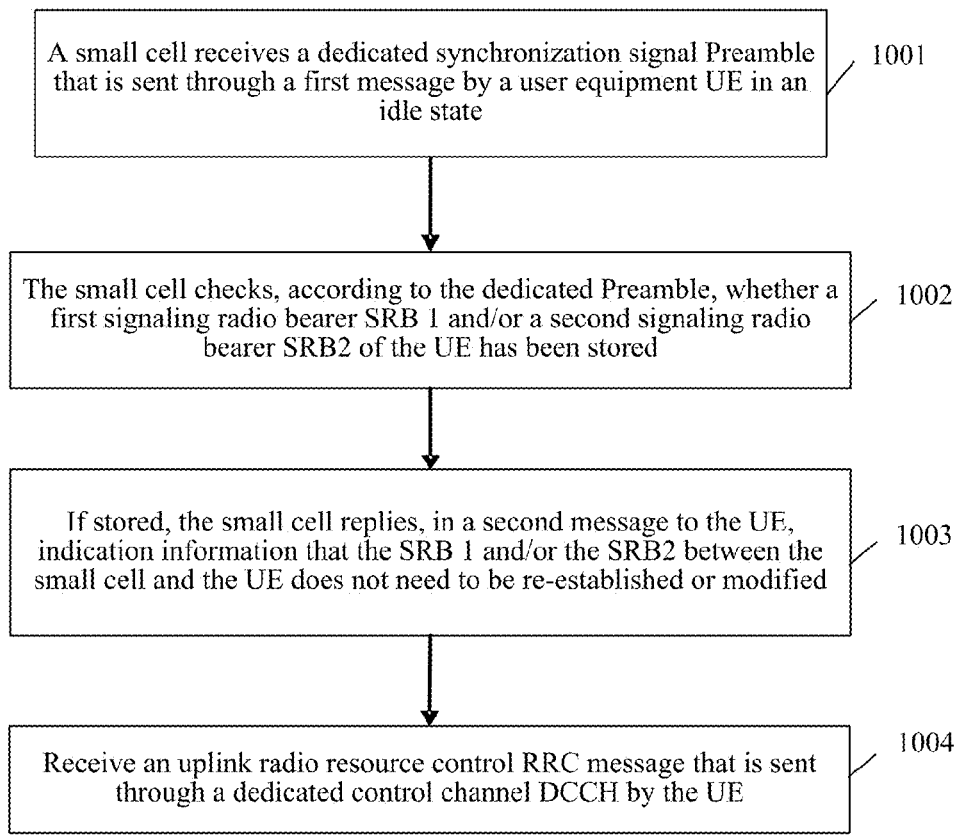
FIG. 10 is a flow chart of another method for wireless broadband communications according to an embodiment of the present invention.

FIG. 10 is a flow chart of another method for wireless broadband communications according to an embodiment of the present invention, and the embodiment includes the following steps.

Step 1001: A small cell receives a dedicated synchronization signal Preamble sent through a first message by a user equipment UE in an idle state, where the dedicated Preamble is allocated when the UE accesses a network for the first time.

Step 1002: The small cell queries, according to the dedicated Preamble, whether a first signaling radio bearer SRB 1 and/or a second signaling radio bearer SRB2 of the UE are/is stored.

Step 1003: If stored, the small cell replies, in a second message to the UE, indication information that the SRB 1 and/or the SRB2 between the small cell and the UE do/does not need to be re-established or modified.

Step 1004: Receive an uplink radio resource control RRC message sent through a dedicated control channel DCCH by the UE.

The embodiment of the present invention is executed by the small cell, and the small cell may be: a small base station (Pico), an indoor base station (Femto), another local wireless access point AP, or a low mobility base station (Low Mobility, LoMo). The embodiment takes that the small cell is a LoMo as an example.

The LoMo in the embodiment of the present invention may be located in a dead zone of the macro base station. The UE may be resident on the LoMo alone.

Figure 11:
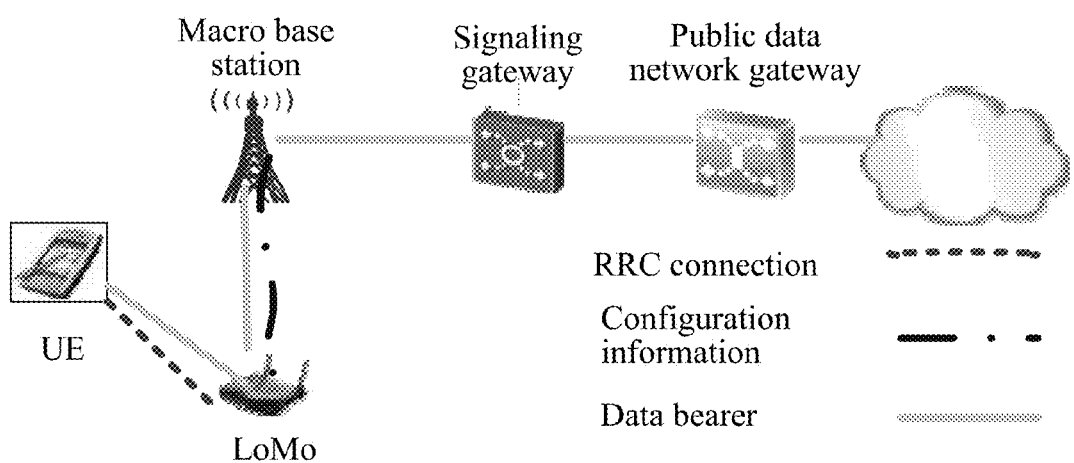
FIG. 11 is a structural diagram of another network topology according to an embodiment of the present invention.

As shown in FIG. 11, the macro base station and the LoMo are connected through a wired or wireless interface, where the wired interface may include: an S1 interface between a base station and a mobility management entity MME, and/or an X2 interface between a base station and another base station, and/or a common public radio interface CPRI, and/or a Iub interface between a radio network controller and a base station. The LoMo receives, through this interface, a configuration message sent through the wired or wireless interface by the macro base station, where the wireless interface includes: a Uu interface between a base station and the UE, and/or a microwave interface for base station transmission. The LoMo and the UE are also connected through an air interface in no need of the macro base station. This interface is a bearer of signaling and data between the UE and the LoMo.

Figure 12:
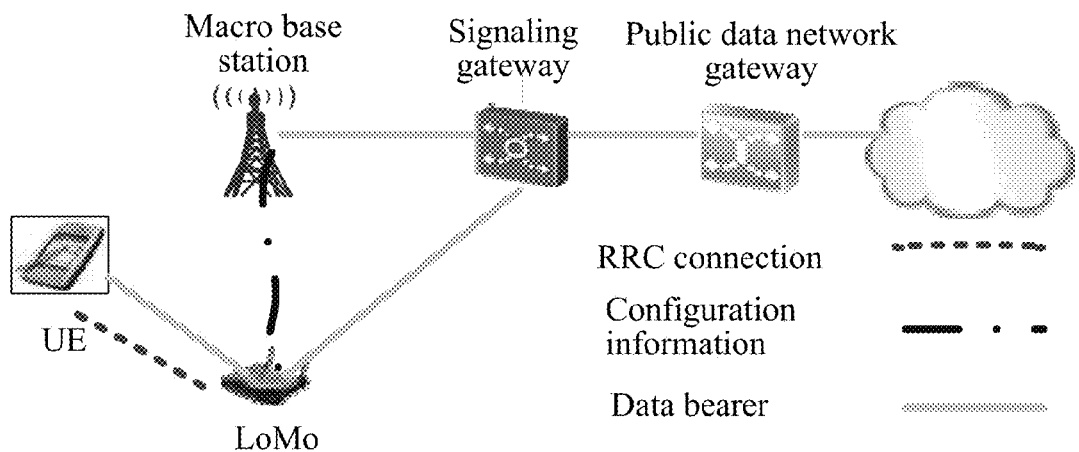
FIG. 12 is a structural diagram of another network topology according to an embodiment of the present invention.

After receiving user plane data of the UE through the data bearer, the LoMo may send the user plane data to the macro base station through the wired or wireless interface between the macro base station and the LoMo in FIG. 11, so that the macro base station forwards the user plane data of the UE to a network element of a core network; or the LoMo may directly send the user plane data of the UE to the network element of the core network through an interface between the network element of the core network and the LoMo in FIG. 12. The network element of the core network in FIG. 12 is a serving gateway S-GW.

If the LoMo directly performs data transmission with the network element of the core network, the LoMo needs to inform the mobility management entity MME of an address of the LoMo, the MME informs the network element of the core network, and then the MME informs the macro base station of an address of the network element of the core network, which is forwarded by the macro base station to the LoMo. The foregoing address may include: a TNL address, a GTP-TEID and/or an Internet protocol IP address.

Figure 13:
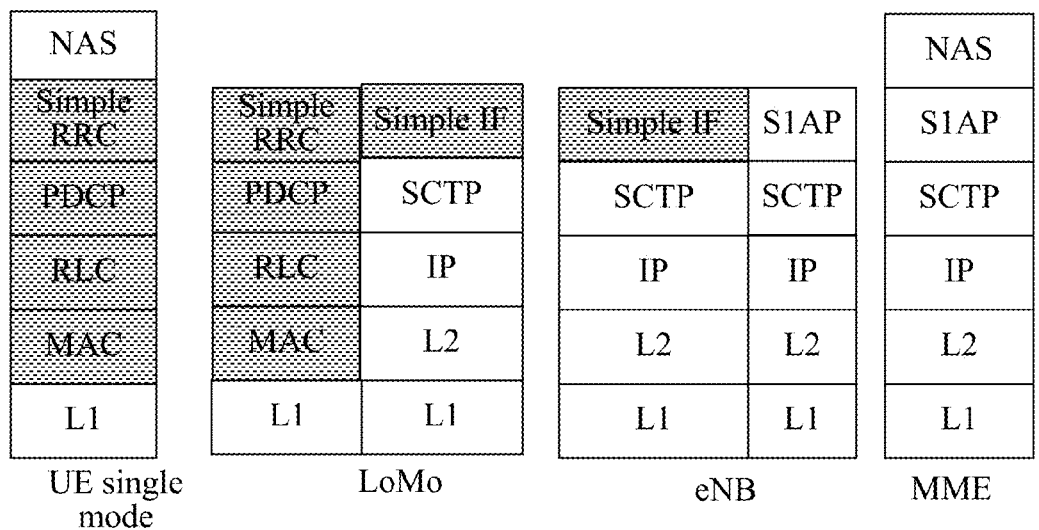
FIG. 13 is a structural diagram of another protocol stack according to an embodiment of the present invention.
Figure 14:
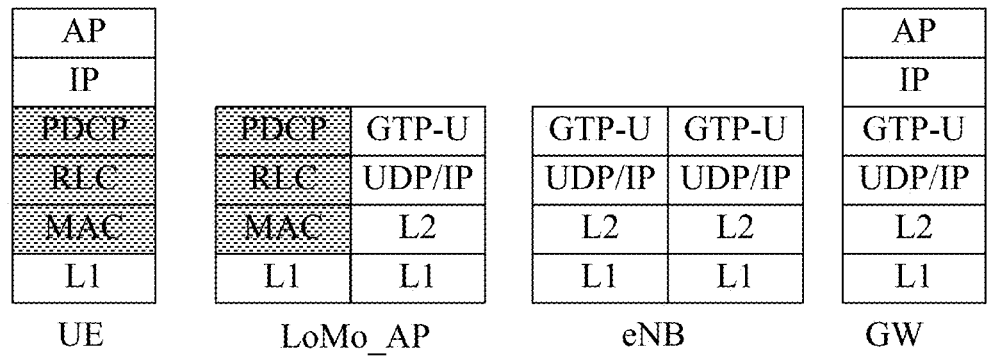
FIG. 14 is a structural diagram of another protocol stack according to an embodiment of the present invention.

A protocol stack of the air interface between the LoMo and the UE may only include: on a control plane, the protocol stack of the air interface between the LoMo and the UE may adopt a simplified protocol stack architecture, such as a simplified RRC protocol entity, as shown in FIG. 13. Functionally, a simplified RRC process as described in FIG. 10 is adopted. On a user plane, the LoMo and the UE may adopt an original user plane protocol stack PDCP/RLC/MAC, which is only tailored functionally. The protocol stack is shown in FIG. 14, and a function simplification part is shown in Table 1.

Figure 15:
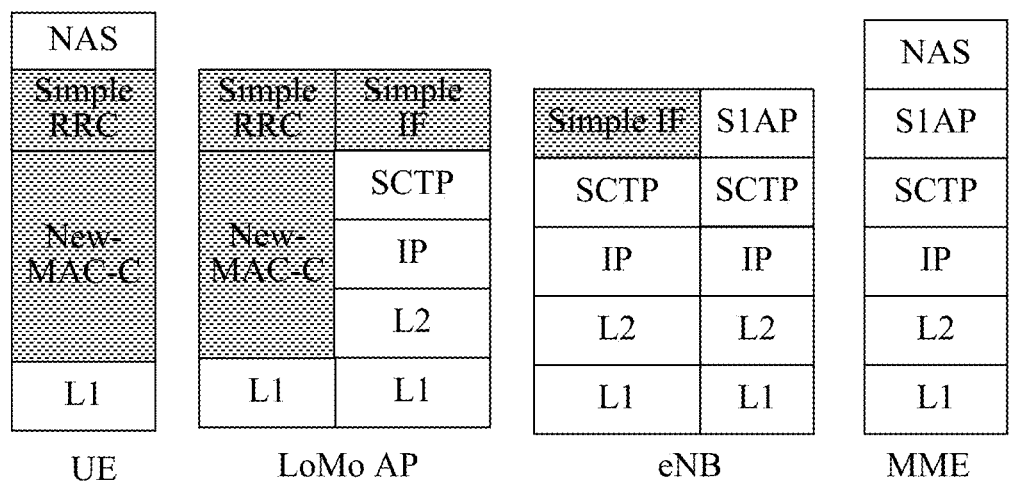
FIG. 15 is a structural diagram of another protocol stack according to an embodiment of the present invention.
Figure 16:
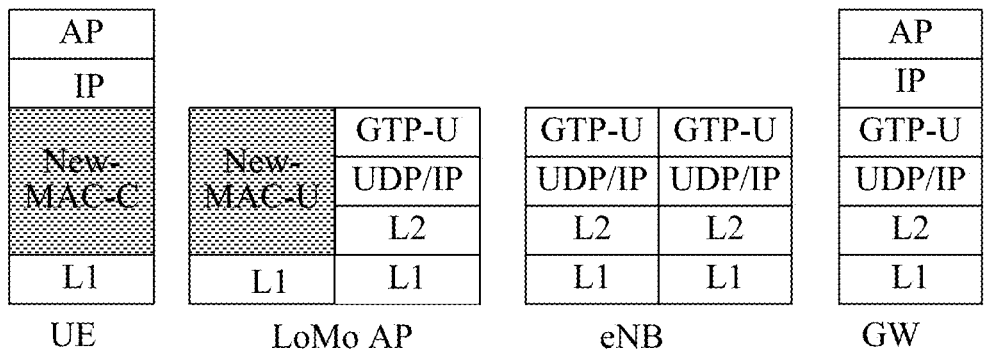
FIG. 16 is a structural diagram of another protocol stack according to an embodiment of the present invention.

A control plane protocol stack between the LoMo and the UE may further combine the PDCP, the RLC and the MAC into a new layer entity, as shown in FIG. 15. A user plane protocol stack between the LoMo and the UE may further combine the PDCP, the RLC and the MAC into a new layer entity, as shown in FIG. 16.

The foregoing network configuration includes at least one of the following: logical channel configuration; signaling radio bearer SRB configuration; MAC layer configuration; semi-persistent scheduling configuration; physical channel configuration; and a timer parameter of an RRC message.

The method according to the embodiment of the present invention may further include the following steps before the small cell receives a dedicated synchronization signal Preamble sent through the first message by the UE in an idle state.

Step 1007: The small cell sends, to the UE, the dedicated Preamble, an SRB, logical channel resource configuration, transmission channel resource configuration and physical channel resource configuration allocated by the network when the UE accesses the network through the small cell for the first time.

Step 1008: Store the dedicated Preamble, the SRB, the logical channel resource configuration, the transmission channel resource configuration and the physical channel resource configuration that are sent.

The method according to the embodiment of the present invention may further include the following step.

Step 1009: If the SRB 1 and/or the SRB2 of the UE are/is not stored, the small cell replies, in the second message to the UE, indication information that the first signaling radio bearer SRB 1 and/or the second signaling radio bearer SRB2 between the small cell and the UE need/needs to be re-established or modified.

If handover between a small cell and another small cell, or handover in a direction from a small cell to a macro base station, or handover in a direction from a macro base station to a small cell needs to be executed, after the notifying the UE to access the network through the small cell, the method further includes the following steps.

Step 1004: The small cell receives measurement control information sent by the macro base station, and forwards the measurement control information to the UE.

Step 1005: Receive a measurement report fed back by the UE, and forward the measurement report to the macro base station.

Step 1006: If the macro base station determines that handover needs to be performed, receive a handover notification sent by the macro base station.

In the method provided according to the embodiment of the present invention, the small cell, by determining a Preamble sent by the UE, knows whether the UE needs to reestablish or modify the SRB 1 and/or the SRB2. If it is determined that the UE does not need to do so, it is directly replied that there is no need to reestablish or modify the SRB 1 and/or the SRB2, thereby saving a flow for establishing the SRB 1 and/or the SRB2, and lowering the cost. Then the UE accesses the network through the small cell, so as to share data traffic of the macro base station, thereby improving the bandwidth and the capacity of mobile broadband communications.

Figure 17:
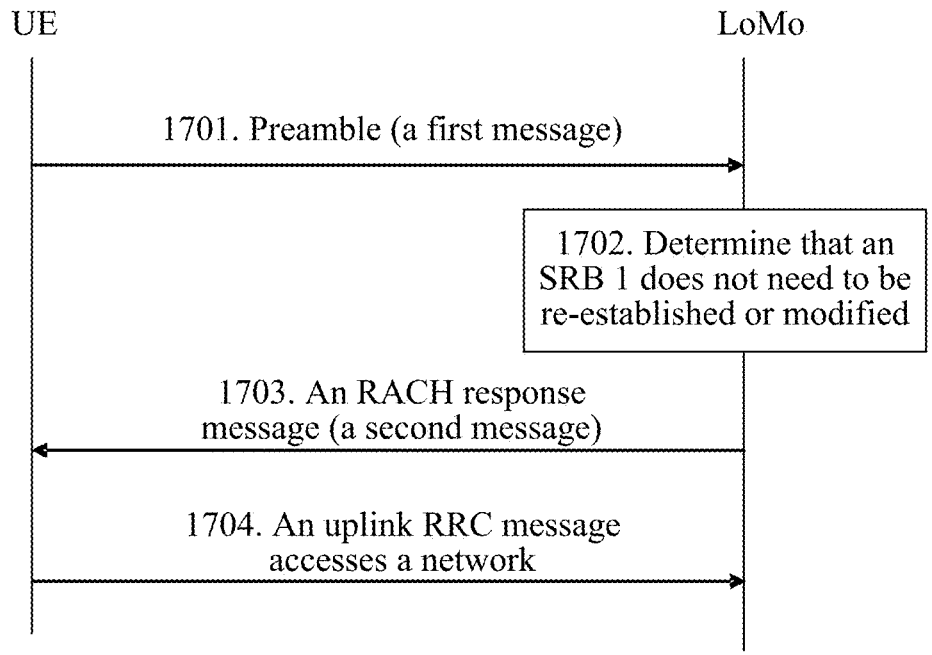
FIG. 17 is a signaling interaction diagram of another method for wireless broadband communications according to an embodiment of the present invention.

FIG. 17 is a signaling interaction diagram of another method for wireless broadband communications according to an embodiment of the present invention, and the embodiment includes the following steps.

Step 1701: A UE receives and stores a dedicated Preamble allocated by a network when accessing a registry network through a LoMo for the first time.

Step 1702: The UE in an idle state sends the foregoing dedicated Preamble to the LoMo when accessing the LoMo again.

Step 1703: The LoMo queries, according to the dedicated Preamble, whether an SRB 1 and/or an SRB2 corresponding to the UE are/is stored.

Step 1704: If the SRB 1 and/or the SRB2 corresponding to the UE are/is stored, the LoMo replies, to the UE, indication information that the SRB 1 and/or the SRB2 do/does not need to be re-established or modified; if the SRB 1 and/or the SRB2 need/needs to be reestablished, the LoMo replies, to the UE, indication information that the SRB 1 and/or the SRB2 need/needs to be re-established or modified.

Step 1705: The UE determines whether the SRB 1 and/or the SRB2 need/needs to be reestablished for random access.

Step 1706: If not stored, the UE accesses the network through an uplink RRC message, and notifies the network of a connection complete, carrying a connection request cause, a resident PLMN network, and the like. If needed, the UE initiates again random access in a competitive mode.

In consideration of low mobility of the UE and an indoor coverage scenario, both a UE state and a network state may change slightly, and therefore, default configuration may be adopted for an amount of configuration, including: logical channel configuration (a transmission mode, a logical channel priority, and the like), SRB configuration (a logical channel number, an RLC configuration parameter, a logical channel group, a logical channel priority, a prior bit rate, and the like), MAC layer configuration (whether to support TTI bundling TTI bundling, the maximum times of HARQ retransmission, a buffer report BSR, a power headroom report PHR, and discontinuous reception DRX configuration), semi-persistent scheduling configuration, physical channel configuration, and a timer parameter of some RRC messages.

After the UE enters the LoMo and obtains configuration initially, the UE and the LoMo store the configuration for next use. Because both the UE state and the network state change slightly at the time of next access, a flow for establishing an RRC connection may be greatly simplified.

A user in an idle state accesses the LoMo, and initiates dedicated random access; the LoMo may identify an identity of the UE according to the dedicated Preamble code.

The LoMo replies a random access response message (random access response) according to the identity of the UE; in the message, a bit is used to indicate whether the SRB 1 and/or SRB2 configuration change/changes, and the UE determines, according to the bit, whether the default configuration can be used to perform dedicated resource configuration on the UE.

If configuration is identical, it indicates that the UE does not need to reestablish the SRB 1 and/or the SRB2; after the random access is completed, the UE may directly send the uplink RRC message in no need of performing the RRC connection again. The uplink RRC message may be a new message or may also be a current RRC connection complete (RRC connection complete) message or RRC connection request (RRC connection request) message which is reused, including a UE ID, an establishing cause, a selected operator network PLMN, a dedicated NAS message and the like. A modification flow is shown in the following drawings.

If handover occurs, no matter which kind of the following handover it is, handover decision and admission control are on a macro base station, as shown in FIG. 11 and FIG. 12:

handover from the LoMo to the macro base station;
handover from the macro base station to the LoMo; and
handover from the LoMo to another LoMo.

As for a handover process of the UE from an LTE LoMo to an LTE macro base station, at first, the LTE macro base station sends a new interface contained measurement control (New IF contained Measurement Control) message to the LTE LoMo; then the LTE LoMo sends a measurement control (Measurement Control) message to control the corresponding UE to perform measurement and send a measurement report; after receiving the corresponding measurement report, the LTE LoMo may send a new interface message contained measurement report (New IF message contained Measurement report) to the LTE macro base station, and the LTE macro base station makes handover decision; if access of the UE is allowed, a new interface message contained handover command (New IF message contained Handover Command) may be sent to the LTE LoMo, and the LTE LoMo sends the handover command (Handover Command) to the corresponding UE; the UE is handed over to a corresponding coverage area of the LTE macro base station; after a connection to the LTE macro base station has been established, the LTE macro base station notifies the LoMo to release corresponding resources.

As for a handover process of the UE from the LTE macro base station to the LTE LoMo, at first, the LTE macro base station sends a Measurement Control message to control the corresponding UE to perform measurement and send a measurement report, and then may further obtain load conditions of the corresponding LoMo, make handover decision, and send a Handover Command to the corresponding UE and LoMo when determining that the LTE macro base station needs to be handed over to the corresponding LoMo; after the UE sends handover confirm (Handover Confirm) to the LoMo, and the LoMo receives a corresponding message, the LoMo sends a resource release request (Resource Release Request) to the LTE macro base station; eventually, the LTE macro base station releases corresponding resources.

In the method provided according to the embodiment of the present invention, the small cell, by determining a Preamble sent by the UE, knows whether the UE needs to reestablish or modify the SRB 1 and/or the SRB2. If it is determined that the UE does not need to do so, it is directly replied that there is no need to reestablish or modify the SRB 1 and/or the SRB2, thereby saving a flow for establishing the SRB 1 and/or the SRB2, and lowering the cost. Then the UE accesses the network through the small cell, so as to share data traffic of the macro base station, thereby improving the bandwidth and the capacity of mobile broadband communications.

Figure 18:
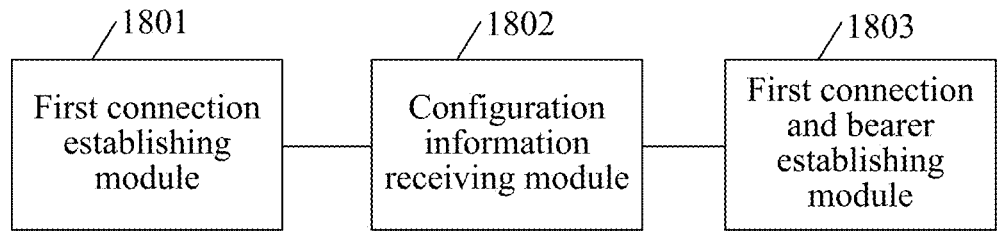
FIG. 18 is a structural diagram of a small cell for wireless broadband communications according to an embodiment of the present invention.

FIG. 18 is a structural diagram of a small cell for wireless broadband communications according to an embodiment of the present invention. The embodiment includes a number of modules.

A first connection establishing module 1801 is configured to establish a radio resource control RRC connection with a UE through a macro base station. A configuration message receiving module 1802 is configured to receive, after the RRC connection is established, a configuration message sent through a wired or wireless interface by the macro base station. A first connection and bearer establishing module 1803 is configured to establish a data plane connection between the small cell and the UE according to the configuration message, and establish a data bearer on the data plane connection with the UE.

The configuration message receiving module of the small cell according to the embodiment of the present invention may be configured to receive user plane protocol configuration information sent through the wired or wireless interface by the macro base station, where the small cell configures radio resources and a measurement parameter used to establish the data plane connection with the UE. Alternatively, or in addition, the module may be configured to receive secondary component carrier SCC configuration information sent through the wired or wireless interface by the macro base station, where the small cell activates a secondary component carrier SCC used to establish the data plane connection with the UE.

The small cell according to the embodiment of the present invention may further include a data transmission module 1804, configured to transmit user plane data between the UE and a network element of a core network through the data bearer. The user plane data between the UE and the network element of the core network is directly transmitted through the small cell. Alternatively, or in addition, the user plane data between the UE and the network element of the core network is transmitted through a path of the UE, the small cell, the macro base station and the network element of the core network.

As for the small cell according to the embodiment of the present invention, the wired interface may include a combination of any one or more of the following an S1 interface between a base station and a mobility management entity MME, an X2 interface between a base station and another base station, a common public radio interface CPRI, and a Iub interface between a radio network controller and a base station.

The wireless interface may include a Uu interface between a base station and the UE, and/or a microwave interface for base station transmission.

As for the small cell according to the embodiment of the present invention, a protocol stack of an air interface between the small cell and the UE only includes: a packet data convergence protocol PDCP, a radio link control RLC layer protocol, a media access control MAC layer protocol, and a layer 1 L1 protocol; and/or does not include a radio resource control RRC layer protocol.

As for the small cell according to the embodiment of the present invention, the configuration message receiving module may be further configured to receive allocation information of static or semi-static configuration resources, and receive resource allocation information used to perform random access on the static or semi-static configuration resources, or resource allocation information used to perform the random access and data scheduling on the static or semi-static configuration resources.

As for the small cell according to the embodiment of the present invention, if configured to receive the resource allocation information used to perform the random access, the configuration message receiving module may further include an allocation information sending module 1805, configured to send, to the UE through the established data bearer, the resource allocation information used to perform the data scheduling on the static or semi-static configuration resources.

As for the small cell according to the embodiment of the present invention, the allocation information sending module may be further configured to send, to the UE through the established data bearer, the resource allocation information used to perform the random access on the static or semi-static configuration resources.

The small cell according to the embodiment of the present invention may further include a reapplying module 1806, configured to reapply to the macro base station for static or semi-static configuration resources if the configuration message receiving module is configured to receive the resource allocation information used to perform the random access and data scheduling, and if the small cell is congested when performing scheduling according to the resource allocation information. Alternatively, or in addition, the small cell may further include a notification handover module 1807, configured to notify the macro base station to hand over the UE to the macro base station if the configuration message receiving module is configured to receive the resource allocation information used to perform the random access and data scheduling, and if the small cell is congested when performing scheduling according to the resource allocation information. Alternatively, or in addition, the small cell may further include a dynamic scheduling module 1808, configured to adopt a dynamic scheduling mode for new access where congestion occurs in resources if the configuration message receiving module is configured to receive the resource allocation information used to perform the random access and data scheduling, and if the small cell is congested when performing scheduling according to the resource allocation information.

As for the small cell according to the embodiment of the present invention, the small cell may include any one of the following a small base station Pico, an indoor base station Femto, a low mobility base station LoMo, a local wireless access point AP, and a UE having a device-to-device (D2D) function.

Compared with the prior art, the small cell provided in the embodiment of the present invention may establish the radio resource control RRC connection with the UE through the macro base station, and then the macro base station performs configuration on the small cell, thereby saving a flow for establishing the RRC connection with the UE and lowering the cost; then, the small cell and the UE establish the data bearer, so as to share data traffic of the macro base station, thereby improving the bandwidth and the capacity of mobile broadband communications.

Figure 19:
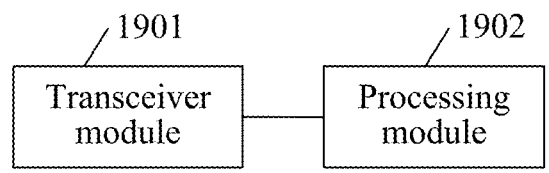
FIG. 19 is a structural diagram of another small cell for wireless broadband communications according to an embodiment of the present invention.

FIG. 19 is a structural diagram of another small cell for wireless broadband communications according to an embodiment of the present invention, and the embodiment includes a transceiver module 1901, configured to receive a dedicated Preamble sent through a first message by a UE in an idle state, where the dedicated Preamble is allocated when the UE accesses a network for the first time, configured to send a second message to the UE after a processing module determines that a first signaling radio bearer SRB 1 and/or a second signaling radio bearer SRB2 of the UE are/is stored, and configured to receive an uplink radio resource control RRC message sent through a dedicated control channel DCCH by the UE after the second message is sent. A processing module 1902 is configured to query whether the SRB 1 and/or the SRB2 of the UE are/is stored according to the dedicated Preamble received by the transceiver module, and configured to carry indication information, in the second message sent by the transceiver module, that the SRB 1 and/or the SRB2 between the small cell and the UE do/does not need to be re-established or modified after it is determined that the SRB 1 and/or the SRB2 of the UE are/is stored.

In the small cell according to the embodiment of the present invention the transceiver module is further configured to receive user plane data of the UE after the RRC message is received, and send the user plane data of the UE to the macro base station, so that the macro base station forwards the user plane data of the UE to a network element of a core network, or configured to send the user plane data of the UE to a network element of a core network.

In the small cell according to the embodiment of the present invention the transceiver module may be further configured to send, to the UE, a dedicated Preamble, an SRB, logical channel resource configuration, transmission channel resource configuration and physical channel resource configuration allocated by a network when the UE accesses the network through the small cell for the first time; and the small cell further includes: a mapping table storing module, configured to store the dedicated Preamble, the SRB, the logical channel resource configuration, the transmission channel resource configuration and the physical channel resource configuration sent by the transceiver module.

As for the small cell according to the embodiment of the present invention, the processing module may be further configured to, if the SRB 1 and/or the SRB2 of the UE are/is not stored, carry, in the second message sent by the transceiver module, indication information that the SRB 1 and/or the SRB2 between the small cell and the UE need/needs to be re-established or modified.

As for the small cell according to the embodiment of the present invention, the transceiver module may be further configured to receive measurement control information sent by the macro base station, and forward the measurement control information to the UE; receive a measurement report fed back by the UE, and forward the measurement report to the macro base station; and receive a handover notification sent after the macro base station determines that handover needs to be performed.

The small cell according to the embodiment of the present invention may include any one of the following a small base station Pico, an indoor base station Femto, a low mobility base station LoMo, and a local wireless access point AP.

The small cell provided in the embodiment of the present invention knows, by determining a Preamble sent by the UE, whether the UE needs to reestablish or modify the SRB 1 and/or the SRB2. If it is determined that the UE does not need to do so, it is directly replied that there is no need to reestablish or modify the SRB 1 and/or the SRB2, thereby saving a flow for establishing the SRB 1 and/or the SRB2, and lowering the cost. Then the UE accesses the network through the small cell, so as to share data traffic of the macro base station, thereby improving the bandwidth and the capacity of mobile broadband communications.

Figure 20:
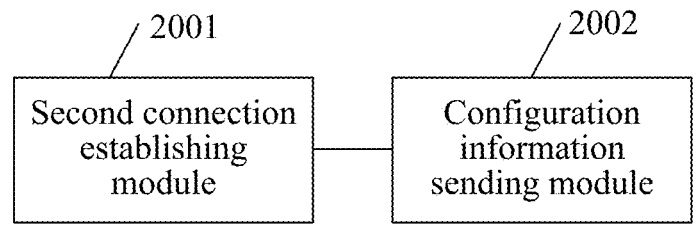
FIG. 20 is a structural diagram of a macro base station for wireless broadband communications according to an embodiment of the present invention.

FIG. 20 is a structural diagram of a macro base station for wireless broadband communications according to an embodiment of the present invention, and the embodiment includes a second connection establishing module 2001, configured to establish a radio resource control RRC connection with a UE; and a configuration message sending module 2002, configured to send an RRC reconfiguration message to the UE through a wireless interface after the RRC connection is established, and send a configuration message to a small cell through a wired or wireless interface, so that the small cell and the UE establish a data plane connection.

As for the macro base station according to the embodiment of the present invention, the configuration message sending module may be configured to send user plane protocol configuration information through the wired or wireless interface, or send secondary component carrier SCC configuration information through the wired or wireless interface.

As for the macro base station according to the embodiment of the present invention, the wired interface may include a combination of any one or more of the following: an S1 interface between a base station and a mobility management entity MME, an X2 interface between a base station and another base station, a common public radio interface CPRI, and a Iub interface between a radio network controller and a base station.

The wireless interface may include a Uu interface between a base station and the UE, and/or a microwave interface for base station transmission.

As for the macro base station according to the embodiment of the present invention, the configuration message sending module may be further configured to send allocation information of static or semi-static configuration resources; and send resource allocation information used to perform random access on the static or semi-static configuration resources, or resource allocation information used to perform the random access and data scheduling on the static or semi-static configuration resources.

The macro base station according to the embodiment of the present invention may further include an application receiving module 2003, configured to receive an application of the static or semi-static configuration resources of the small cell; or a handover notification receiving module 2004, configured to receive a notification of handing over the UE to the macro base station.

Compared with the prior art, the macro base station provided in the embodiment of the present invention may establish the RRC connection between the UE and the small base station, and then perform configuration on the small cell, so that the small base station and the UE establish a data bearer, and the small base station shares data traffic of the macro base station, thereby improving the bandwidth and the capacity of mobile broadband communications; moreover, the total cost of the system is low.

Figure 21:
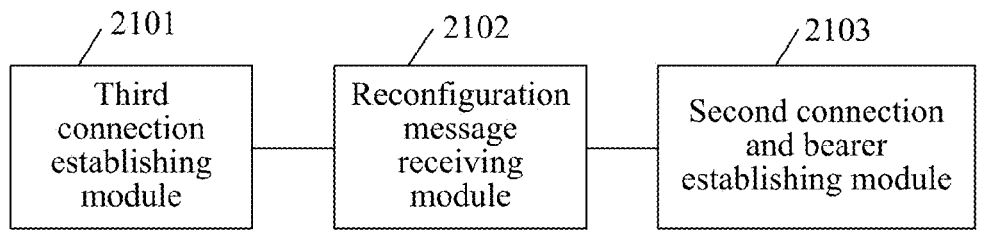
FIG. 21 is a structural diagram of a UE according to an embodiment of the present invention.

FIG. 21 is a structural diagram of a UE according to an embodiment of the present invention, and the embodiment includes a third connection establishing module 2101, configured to establish a radio resource control RRC connection with a macro base station. A reconfiguration message receiving module 2102, configured to receive, after the RRC connection is established, an RRC reconfiguration message sent by the macro base station to the UE. A second connection and bearer establishing module 2103, configured to establish a data plane connection with a small cell according to the RRC reconfiguration message, and establish a data bearer on the data plane connection with the small cell.

The UE according to the embodiment of the present invention is characterized in that a protocol stack of an air interface between the small cell and the UE only includes: a packet data convergence protocol PDCP, a radio link control RLC layer protocol, a media access control MAC layer protocol, and a layer 1 L1 protocol; and/or does not include: a radio resource control RRC layer protocol.

Compared with the prior art, the UE provided in the embodiment of the present invention may establish the RRC connection with the small base station through the macro base station, and then establish the data plane connection with the small base station through RRC reconfiguration, and the small base station shares data traffic of the macro base station, thereby improving the bandwidth and the capacity of mobile broadband communications; moreover, the total cost of the system is low.

Figure 22:
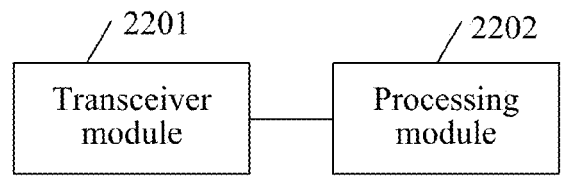
FIG. 22 is a structural diagram of another UE according to an embodiment of the present invention.

FIG. 22 is a structural diagram of another UE according to an embodiment of the present invention, and the embodiment includes a transceiver module 2201, configured to send a dedicated synchronization signal Preamble through a first message when the UE is in an idle state, where the dedicated Preamble is allocated when the UE accesses a network for the first time; receive indication information sent by a small cell in a second message; and send an uplink RRC message through a dedicated control channel DCCH based on a notification of a processing module. A processing module 2202, configured to notify the transceiver module to send an uplink RRC message through the DCCH when it is determined that the indication information received by the transceiver module is indication information that a first signaling radio bearer SRB 1 and/or a second signaling radio bearer SRB2 of the UE do/does not need to be re-established or modified.

Figure 25:
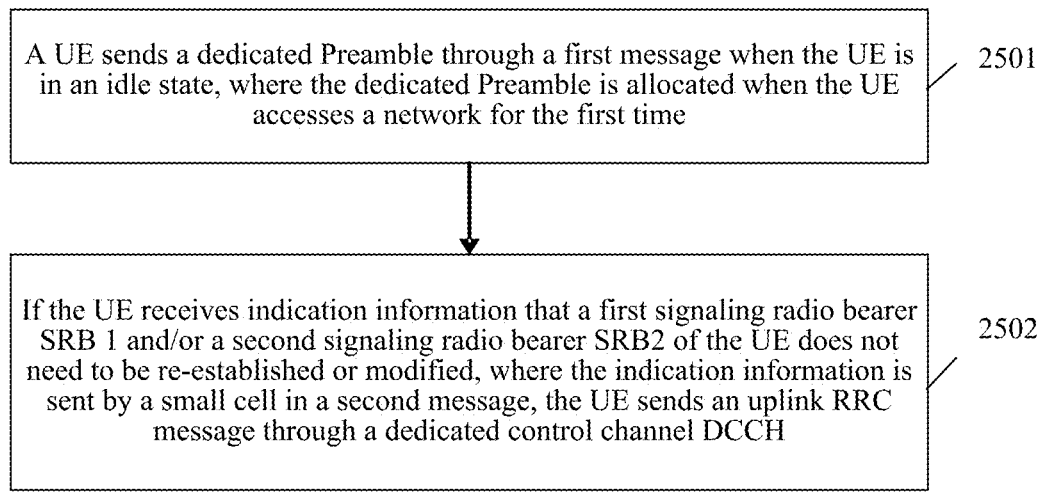
FIG. 25 is a flow chart of another method for wireless broadband communications according to an embodiment of the present invention.

The UE according to the embodiment of the present invention may be configured to execute a method of an embodiment corresponding to FIG. 25.

In the UE according to the embodiment of the present invention the transceiver module may be further configured to receive a dedicated Preamble, an SRB, logical channel resource configuration, transmission channel resource configuration and physical channel resource configuration allocated by a network and sent by the small cell when the UE accesses the network through the small cell for the first time; and the UE may further include: a mapping table storing module, configured to store the dedicated Preamble, the SRB, the logical channel resource configuration, the transmission channel resource configuration and the physical channel resource configuration received by the transceiver module.

The processing module may be further configured to access randomly the network in a competitive mode when it is determined that the indication information received by the transceiver module is indication information that the SRB 1 and/or the SRB2 need/needs to be re-established or modified.

To execute handover between a small cell and another small cell, handover in a direction from a small cell to a macro base station, or handover in a direction from a macro base station to a small cell, the transceiver module may be further configured to receive measurement control information forwarded by the small cell, and feed back a measurement report according to a notification of a measurement feedback module; and the UE may further include: the measurement feedback module, configured to perform measurement according to the measurement control information received by the transceiver module, and notify the transceiver module to feed back the measurement report.

The UE provided in the embodiment of the present invention enables, by sending a Preamble, the small cell to know whether the UE needs to reestablish or modify the SRB 1 and/or the SRB2. If it is determined that the UE does not need to do so, a reply and a notification that there is no need to reestablish or modify the SRB 1 and/or the SRB2 and the UE accesses the network are received, thereby saving a flow for establishing the SRB 1 and/or the SRB2, and lowering the cost. Then the UE accesses the network through the small cell, so as to share data traffic of the macro base station, thereby improving the bandwidth and the capacity of mobile broadband communications.

Figure 23:
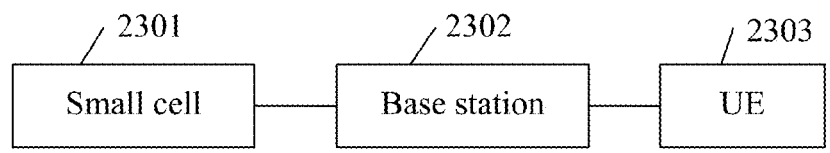
FIG. 23 is a structural diagram of a system for wireless broadband communications according to an embodiment of the present invention.

FIG. 23 is a structural diagram of a system for wireless broadband communications according to an embodiment of the present invention, and the embodiment includes the following components.

A small cell 2301 is configured to establish a radio resource control RRC connection with a UE through a macro base station; receive, after the RRC connection is established, a configuration message sent through a wired or wireless interface by the macro base station; and establish a data plane connection between the small cell and the UE according to the configuration message, and establish a data bearer on the data plane connection with the UE.

A base station 2302 is configured to establish the radio resource control RRC connection with the UE; and configured to send an RRC reconfiguration message to the UE through a wireless interface after the RRC connection is established, and send a configuration message to the small cell through a wired or wireless interface, so that the small cell and the UE establish the data plane connection.

A UE 2303, configured to establish the radio resource control RRC connection with the macro base station; receive, after the RRC connection is established, the RRC reconfiguration message sent by the macro base station to the UE; and to establish the data plane connection with the small cell according to the RRC reconfiguration message, and establish a data bearer on the data plane connection with the small cell.

Compared with the prior art, in the system provided in the embodiment of the present invention, the small cell may establish the radio resource control RRC connection with the UE through the macro base station, and then the macro base station performs configuration on the small cell, thereby saving a flow for establishing the RRC connection with the UE and lowering the cost; then, the small cell and the UE establish the data bearer, so as to share data traffic of the macro base station, thereby improving the bandwidth and the capacity of mobile broadband communications.

Figure 24:
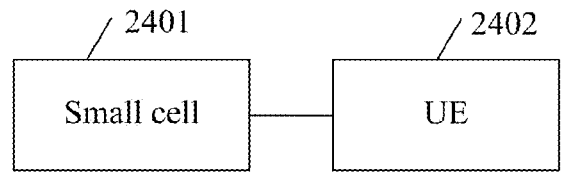
FIG. 24 is a structural diagram of another system for wireless broadband communications according to an embodiment of the present invention.

FIG. 24 is a structural diagram of another system for wireless broadband communications according to an embodiment of the present invention, and the embodiment includes a small cell 2401 and a UE 2402. The small cell 2401 is configured to receive a synchronization signal Preamble sent through a first message by a UE in an idle state, where the small cell determines that the Preamble is a dedicated Preamble; reply, in a second message, indication information that a first signaling radio bearer SRB 1 and/or a second signaling radio bearer SRB2 do/does not need to be re-established or modified; and notify the UE to access a network through the small cell. The UE 2402, configured to send the synchronization signal Preamble through the first message when being in the idle state; receive the indication information, in the second message, that the first signaling radio bearer SRB 1 and/or the second signaling radio bearer SRB2 do/does not need to be re-established or modified; and receive a notification that the UE accesses the network through the small cell.

In the system provided according to the embodiment of the present invention, the small cell, by determining a Preamble sent by the UE, knows whether the UE needs to reestablish or modify the SRB 1 and/or the SRB2. If it is determined that the UE does not need to do so, it is directly replied that there is no need to reestablish or modify the SRB 1 and/or the SRB2, thereby saving a flow for establishing the SRB 1 and/or the SRB2, and lowering the cost. Then the UE accesses the network through the small cell, so as to share data traffic of the macro base station, thereby improving the bandwidth and the capacity of mobile broadband communications.

FIG. 25 is a flow chart of another method for wireless broadband communications according to an embodiment of the present invention, and the embodiment includes the following steps.

Step 2501: A UE sends a dedicated Preamble through a first message when the UE is in an idle state, where the dedicated Preamble is allocated when the UE accesses a network for the first time.

Step 2502: If the UE receives indication information, sent by a small cell in a second message, that a first signaling radio bearer SRB 1 and/or a second signaling radio bearer SRB2 of the UE do/does not need to be re-established or modified, the UE sends an uplink RRC message through a dedicated control channel DCCH.

The method provided according to the embodiment of the present invention may further include the following steps.

Step 2503: The UE receives the dedicated Preamble, an SRB, logical channel resource configuration, transmission channel resource configuration and physical channel resource configuration allocated by the network and sent by the small cell when the UE accesses the network through the small cell for the first time.

Step 2504: Store the dedicated Preamble, the SRB, the logical channel resource configuration, the transmission channel resource configuration and the physical channel resource configuration that are received.

The method provided according to the embodiment of the present invention may further include the following step.

Step 2505: If the UE receives indication information, sent by the small cell in the second message, that the first signaling radio bearer SRB 1 and/or the second signaling radio bearer SRB2 need/needs to be re-established or modified, the UE randomly accesses the network in a competitive mode.

If handover between a small cell and another small cell, handover in a direction from a small cell to a macro base station, or handover in a direction from a macro base station to a small cell needs to be executed, the method may further include the following steps.

Step 2506: The UE receives measurement control information forwarded by the small cell.

Step 2507: The UE performs measurement according to the measurement control information, and feeds back a measurement report.

In the method provided according to the embodiment of the present invention, the UE enables, by sending a Preamble, the small cell to know whether the UE needs to reestablish or modify the SRB 1 and/or the SRB2. If it is determined that the UE does not need to do so, a reply and a notification that there is no need to reestablish or modify the SRB 1 and/or the SRB2 and the UE accesses the network are received, thereby saving a flow for establishing the SRB 1 and/or the SRB2, and lowering the cost. Then the UE accesses the network through the small cell, so as to share data traffic of the macro base station, thereby improving the bandwidth and the capacity of mobile broadband communications.

Through the foregoing description of the embodiments, it is clear to persons skilled in the art that the present invention may be implemented by software plus necessary universal hardware, and definitely may also be implemented by hardware, but in many cases, the software implementation is preferred. Based on such an understanding, the technical solutions of the present invention essentially, or the part contributing to the prior art may be implemented in a form of a software product. The computer software product is stored in a readable storage medium, for example, a floppy disk, a hard disk, or an optical disk of the computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall fall within the protection scope defined by the appended claims.

What is claimed is:

1. A method for wireless broadband communications, the method comprising:
   receiving, by a small cell, a dedicated synchronization signal Preamble sent through a first message by a user equipment UE in an idle state, wherein the dedicated Preamble is allocated when the UE accesses a network for the first time;
   querying, by the small cell according to the dedicated Preamble, whether a first signaling radio bearer SRB 1 and/or a second signaling radio bearer SRB2 of the UE are/is stored;
   if stored, replying, by the small cell in a second message to the UE, indication information that the SRB 1 and/or the SRB2 between the small cell and the UE do/does not need to be re-established or modified;
   receiving an uplink radio resource control RRC message sent through a dedicated control channel by the UE; and
   before the receiving, by a small cell, a dedicated synchronization signal Preamble sent through a first message by a UE in an idle state, sending, by the small cell to the UE, the dedicated Preamble, an SRB, logical channel resource configuration, transmission channel resource configuration and physical channel resource configuration allocated by the network when the UE accesses the network through the small cell for the first time, and storing the dedicated Preamble, the SRB, the logical channel resource configuration, the transmission channel resource configuration and the physical channel resource configuration that are sent.

2. The method according to claim 1, wherein, after the receiving an uplink radio resource control RRC message, wherein the method further comprises:
   receiving, by the small cell, user plane data of the UE; and
   sending, by the small cell, the user plane data of the UE to the macro base station, so that the macro base station forwards the user plane data of the UE to a network element of a core network.

3. The method according to claim 1, wherein, after the receiving an uplink radio resource control RRC message sent through a dedicated control channel DCH by the UE, wherein the method further comprises:
   receiving, by the small cell, user plane data of the UE; and
   sending, by the small cell, the user plane data of the UE to the network element of the core network.

4. The method according to claim 1, further comprising, if the SRB 1 and/or the SRB2 of the UE are/is not stored, replying, by the small cell in the second message to the UE, indication information that the first signaling radio bearer SRB 1 and/or the second signaling radio bearer SRB2 between the small cell and the UE need/needs to be re-established or modified.

5. The method according to claim 1, wherein, a handover between a small cell and another small cell, a handover in a direction from a small cell to a macro base station, or handover in a direction from a macro base station to a small cell needs to be executed, the method further comprising:
   receiving, by the small cell, measurement control information sent by the macro base station, and forwarding the measurement control information to the UE;
   receiving a measurement report fed back by the UE, and forwarding the measurement report to the macro base station; and
   receiving a handover notification sent by the macro base station when the macro base station determines that handover needs to be performed.

6. The method according to claim 1, wherein the small cell comprises any one of the following a small base station Pico, an indoor base station Femto, a low mobility base station LoMo, and a local wireless access point AP.

7. A method for wireless broadband communications, the method comprising:
   sending, by a UE, a dedicated Preamble through a first message when the UE is in an idle state, wherein the dedicated Preamble is allocated when the UE accesses a network for the first time;
   receiving, by the UE, indication information, sent by a small cell in a second message, that a first signaling radio bearer SRB 1 and/or a second signaling radio bearer SRB2 of the UE do/does not need to be re-established or modified, and sending, by the UE, an uplink RRC message through a dedicated control channel;
   receiving, by the UE, the dedicated Preamble, an SRB, logical channel resource configuration, transmission channel resource configuration and physical channel resource configuration allocated by the network and sent by the small cell when the UE accesses the network through the small cell for the first time and
   storing the dedicated Preamble, the SRB, the logical channel resource configuration, the transmission channel resource configuration and the physical channel resource configuration that are received.

8. The method according to claim 7, further comprising receiving, by the UE, indication information, sent by the small cell in the second message, that the first signaling radio bearer SRB 1 and/or the second signaling radio bearer SRB2 need/needs to be re-established or modified, and accessing, by the UE, randomly the network in a competitive mode.

9. The method according to claim 7, if handover between a small cell and another small cell, handover in a direction from a small cell to a macro base station, or handover in a direction from a macro base station to a small cell needs to be executed, further comprising:
  receiving, by the UE, measurement control information forwarded by the small cell; and
  performing, by the UE, measurement according to the measurement control information, and feeding back a measurement report.

10. A small cell for wireless broadband communications, comprising:
  a transceiver module, configured to receive a dedicated Preamble sent through a first message by a UE in an idle state, wherein the dedicated Preamble is allocated when the UE accesses a network for the first time, configured to send a second message to the UE after a processing module determines that a first signaling radio bearer SRB 1 and/or a second signaling radio bearer SRB2 of the UE are/is stored, and configured to receive an uplink radio resource control RRC message sent through a dedicated control channel by the UE after the second message is sent; and
  the processing module, configured to query whether the SRB 1 and/or the SRB2 of the UE are/is stored according to the dedicated Preamble received by the transceiver module, and configured to carry indication information, in the second message sent by the transceiver module, that the SRB 1 and/or the SRB2 between the small cell and the UE do/does not need to be re-established or modified after it is determined that the SRB 1 and/or the SRB2 of the UE are/is stored,
  wherein the transceiver module is further configured to send, to the UE, the dedicated Preamble, an SRB, logical channel resource configuration, transmission channel resource configuration and physical channel resource configuration allocated by the network when the UE accesses the network through the small cell for the first time, and
  wherein the small cell further comprises a mapping table storing module, configured to store the dedicated Preamble, the SRB, the logical channel resource configuration, the transmission channel resource configuration and the physical channel resource configuration sent by the transceiver module.

11. The small cell according to claim 10, wherein the transceiver module is further configured to receive user plane data of the UE after the RRC message is received, and to send the user plane data of the UE to the macro base station, so that the macro base station forwards the user plane data of the UE to a network element of a core network, or configured to send the user plane data of the UE to the network element of the core network.

12. The small cell according to claim 10, wherein the processing module is further configured to, if the SRB 1 and/or the SRB2 of the UE are/is not stored, carry, in the second message sent by the transceiver module, indication information that the SRB 1 and/or the SRB2 between the small cell and the UE need/needs to be re-established or modified.

13. The small cell according to claim 10, wherein the transceiver module is further configured to receive measurement control information sent by the macro base station, and forward the measurement control information to the UE, to receive a measurement report fed back by the UE, and forward the measurement report to the macro base station, and to receive a handover notification sent after the macro base station determines that handover needs to be performed.

14. The small cell according to claim 10, comprising any one of the following: a small base station Pico, an indoor base station Femto, a low mobility base station LoMo, a local wireless access point AP, and a low power node low power node.

* * * * *